(12) United States Patent
Yang et al.

(10) Patent No.: US 7,499,679 B2
(45) Date of Patent: Mar. 3, 2009

(54) WIRELESS NETWORK ACCESS POINT AND SENSOR

(76) Inventors: James Yang, 1601 Valley Crest Dr., San Jose, CA (US) 95131; Herb Schneider, 24052 Oak Knoll Cir., Los Altos Hills, CA (US) 94022; David Gere, 1002 Paradise Way, Palo Alto, CA (US) 94306; Brian Ray, 2575 Ancona Cir., Livermore, CA (US) 94550; Nitin Bhandari, 5036 Castlewood Cmn., Fremont, CA (US) 94536; Brian Kline, 47430 Fernald St., Fremont, CA (US) 94539

( * ) Notice: Subject to any disclaimer, the term of this patent is extended or adjusted under 35 U.S.C. 154(b) by 361 days.

(21) Appl. No.: 11/240,831

(22) Filed: Sep. 30, 2005

(65) Prior Publication Data
US 2007/0077899 A1    Apr. 5, 2007

(51) Int. Cl.
*H04B 1/38* (2006.01)
(52) U.S. Cl. .................................. 455/90.3; 456/556.1
(58) Field of Classification Search ................. 455/561, 455/90.3, 550.1, 556.1, 557; 370/328, 908
See application file for complete search history.

(56) References Cited

U.S. PATENT DOCUMENTS
2002/0119769 A1 * 8/2002 Heinonen et al. ........... 455/422
2005/0136972 A1 * 6/2005 Smith et al. ............. 455/554.1

FOREIGN PATENT DOCUMENTS
| EP | 0 069 639 A2 | 1/1996 |
| EP | 1 191 355 A2 | 3/2002 |
| WO | WO-99/37047 | 7/1999 |
| WO | WO-99/46921 | 9/1999 |
| WO | WO-03/015318 A1 | 2/2003 |

OTHER PUBLICATIONS

"International Search Report & Written Opinion from PCT/US2006/037513 mailed Jan. 10, 2007 13 pgs".
U.S. Appl. No. 10/888,695, filed Jul. 8, 2004, Yang et al.
U.S. Appl. No. 10/449,937, filed May 30, 2003, Enns et al.
International Preliminary Report on Patentability (Chapter 1) mailed Apr. 10, 2008 for International Application No. PCT/US2006/037513.

* cited by examiner

*Primary Examiner*—Quochien B Vuong
(74) *Attorney, Agent, or Firm*—Blakely Sokoloff Taylor & Zafman LLP (57) ABSTRACT

A wireless network access point with an integrated sensor to sense and receive input unrelated to control of or data transmitted via the wireless network access point.

23 Claims, 8 Drawing Sheets

WIRELESS NETWORK ACCESS POINT AND SENSOR

FIELD OF THE INVENTION

Embodiments of this invention relate generally to computer network access points. More particularly, embodiments of the invention relate to a wireless computer network access point with a sensor.

BACKGROUND

Monitoring systems in buildings routinely gather information about the condition of the premises. This is sometimes done using sensors that act as eyes and ears posted throughout the premises. The sensors monitor the environment and send data to a location where it can be processed. The information that sensors gather may include a notification of the occurrence of some event, such as the presence of an intruder, or data about the physical condition of some portion of the premises, to name only two examples. The information may be collected for security purposes, for the effective and efficient management of resources, or for a host of other reasons. However, the collection of all of this varied information poses difficult challenges.

For example, the deployment of sensors throughout a building can often be prohibitively expensive. While certain types of sensors can be manufactured inexpensively, they may often require dedicated signal and control lines to a central processor that controls the sensors and monitors their output. This can require a great deal of costly infrastructure investment. Other sensors may not require such costly building infrastructure improvements, but instead may each require their own processor both for control purposes and to operate a communication protocol allowing the sensor to transmit data to another location. This requirement can make the sensors themselves prohibitively expensive. Thus, those who wish to use sensors to monitor premises often face costly infrastructure improvements, expensive sensors, or both.

At the same time, most buildings now have computer network infrastructures in place. Wireless computer network access points, or WAPs, are often a significant part of the computer network infrastructure. WAPs are placed throughout the premises and serve to extend wireless network connectivity to devices that are properly equipped. To fulfill this task, WAPs are equipped with network connections, processors, and other communications hardware—all elements that could be utilized in a premises-wide sensing system. Thus, it would be beneficial to leverage investments in network infrastructures and WAPs in buildings to further provide for sensing of the building environment.

SUMMARY OF THE INVENTION

One embodiment of the invention is a wireless computer network access point with a sensor. The sensor may be physically integrated into the housing of the wireless computer network access point or it may comprise a detachable module.

In some embodiments, the sensor may be communicatively coupled to a server via the wireless computer network access point. The sensor may be configured to electrically couple to a processor and to computer network signaling circuitry within the wireless computer network access point. The wireless computer network access point may receive data from the sensor, encapsulate it into data packets and forward the data packets over a network to the server.

BRIEF DESCRIPTION OF THE FIGURES

Certain embodiments of the invention may be best understood when taken in conjunction with the accompanying figures, in which.

DETAILED DESCRIPTION

In the following description, various aspects of a wireless network access point with a sensor will be described. Certain details known and understood by one of ordinary skill in the art of the invention are not included in this specification in order to avoid obscuring those features that are inventive. Nevertheless, one of ordinary skill in the art will be able to make and use the invention based upon this disclosure. Furthermore, one of ordinary skill in the art of this invention will understand that, while the invention is described in the context of several exemplary embodiments, many alterations could be made to the embodiments described below without departing from the scope of the invention.

It should also be appreciated that reference throughout this specification to "one embodiment" or "an embodiment" means that a particular feature, structure or characteristic described in connection with the embodiment is included in at least one embodiment of the invention. Therefore, it is emphasized and should be appreciated that two or more references to "an embodiment" or "one embodiment" or "an alternative embodiment" in various portions of this specification do not necessarily all refer to the same embodiment. Furthermore, the particular features, structures or characteristics may be combined as suitable in one or more embodiments of the invention.

Figure 1:
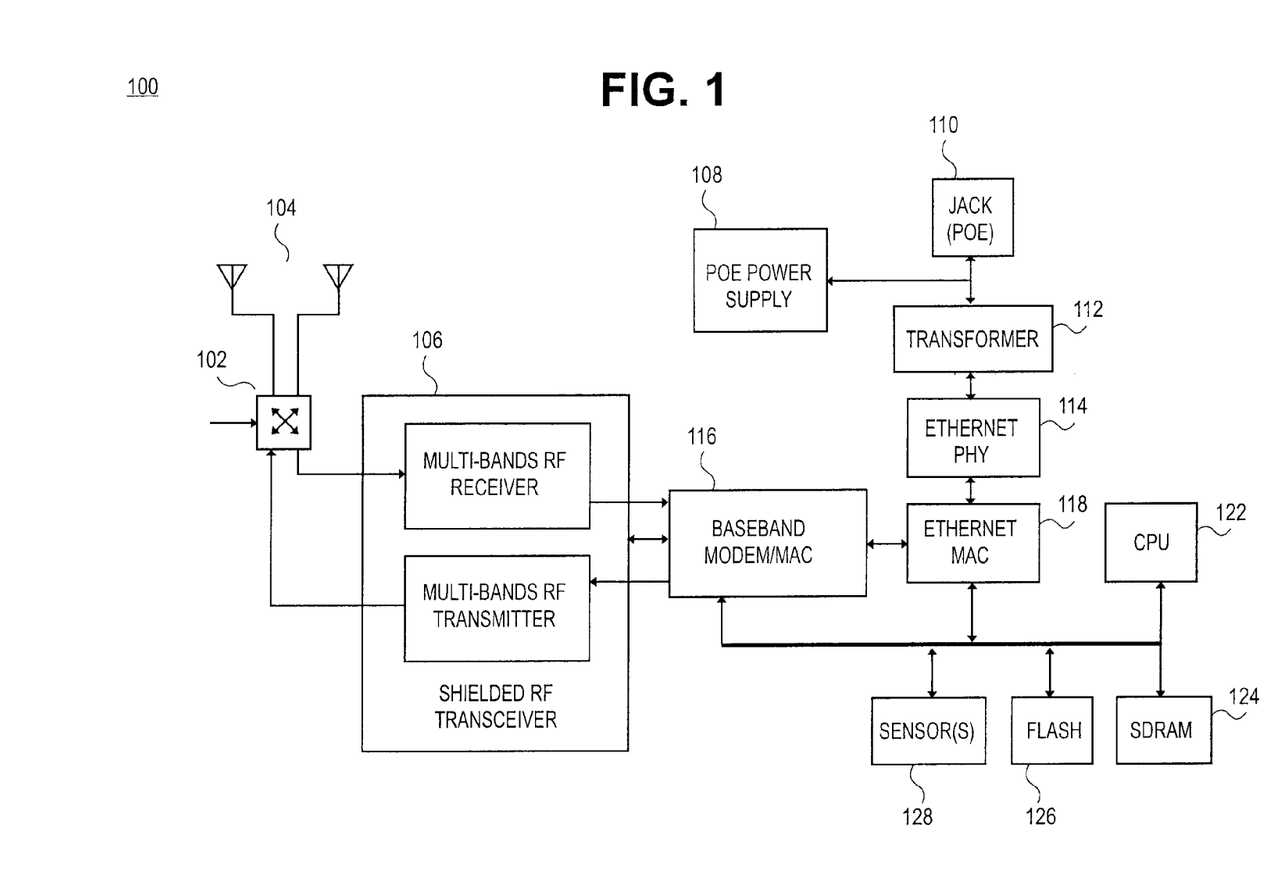
FIG. 1 is a functional block diagram of a wireless computer network access point with a sensor.

FIG. 1 shows a functional block diagram, according to one embodiment of the invention, of a wireless computer network access point 100, or WAP, with a sensor 128. The WAP 100 connects to a local area network (LAN) via the jack 110. The WAP is illustrated as implementing the Ethernet signaling protocol, though it should be understood that the inventive features could be incorporated into a WAP operating under a wide variety of computer communication protocols including Token Ring, ATM, and SONET, for example. The jack 110 connects the WAP 100 to a physical, wired Ethernet LAN infrastructure and also delivers power to the WAP in accordance with Power Over Ethernet (PoE), which is known in the art. In other embodiments, the WAP 100 could be powered by any other suitable means. The WAP 100 also includes a transformer 112, an Ethernet physical layer 114, an Ethernet MAC 118, a central processing unit (CPU) 122, SDRAM 124 and flash 126 memories, a baseband MODEM 116, an RF transceiver 106, and a diversity antenna system 104 and switch 102.

In the figure, the baseband MODEM 116 and RF transceiver 106 are shown as implementing the IEEE 802.11 standard, including subsections "a," "b," and "g," though other wireless protocols such as Bluetooth could also be implemented without departing from the scope of the invention. The WAP 100 may be simplified by implementing only subsections "b" and "g" of the 802.11 standard, though it may be preferable to also implement subsection "a" for high-density networking settings. The WAP 100 extends network connectivity from a wired network to properly enabled devices within a certain range of the WAP 100 by receiving and then broadcasting or forwarding data packets from devices connected to the WAP through the wired network to those devices in the RF range of the WAP and vice versa.

Figure 2:
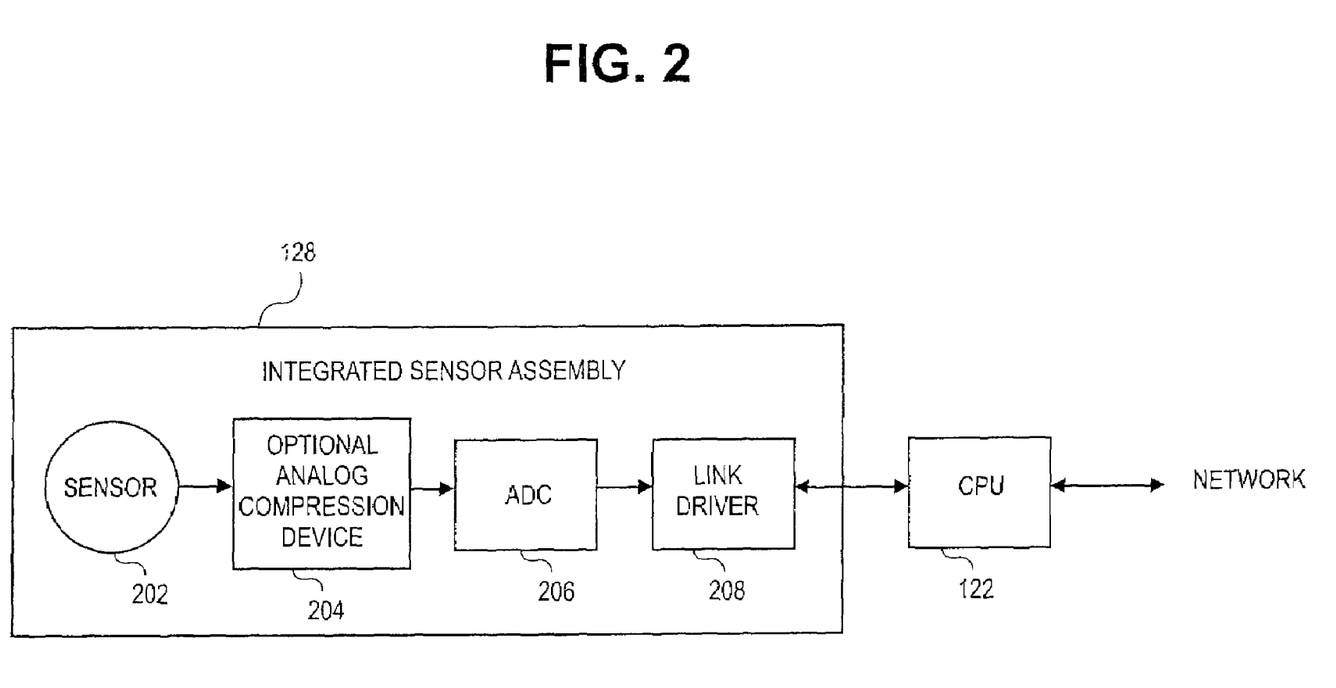
FIG. 2 is a functional block diagram of the architecture for one sensor that can be utilized in embodiments of the invention.
Figure 3:
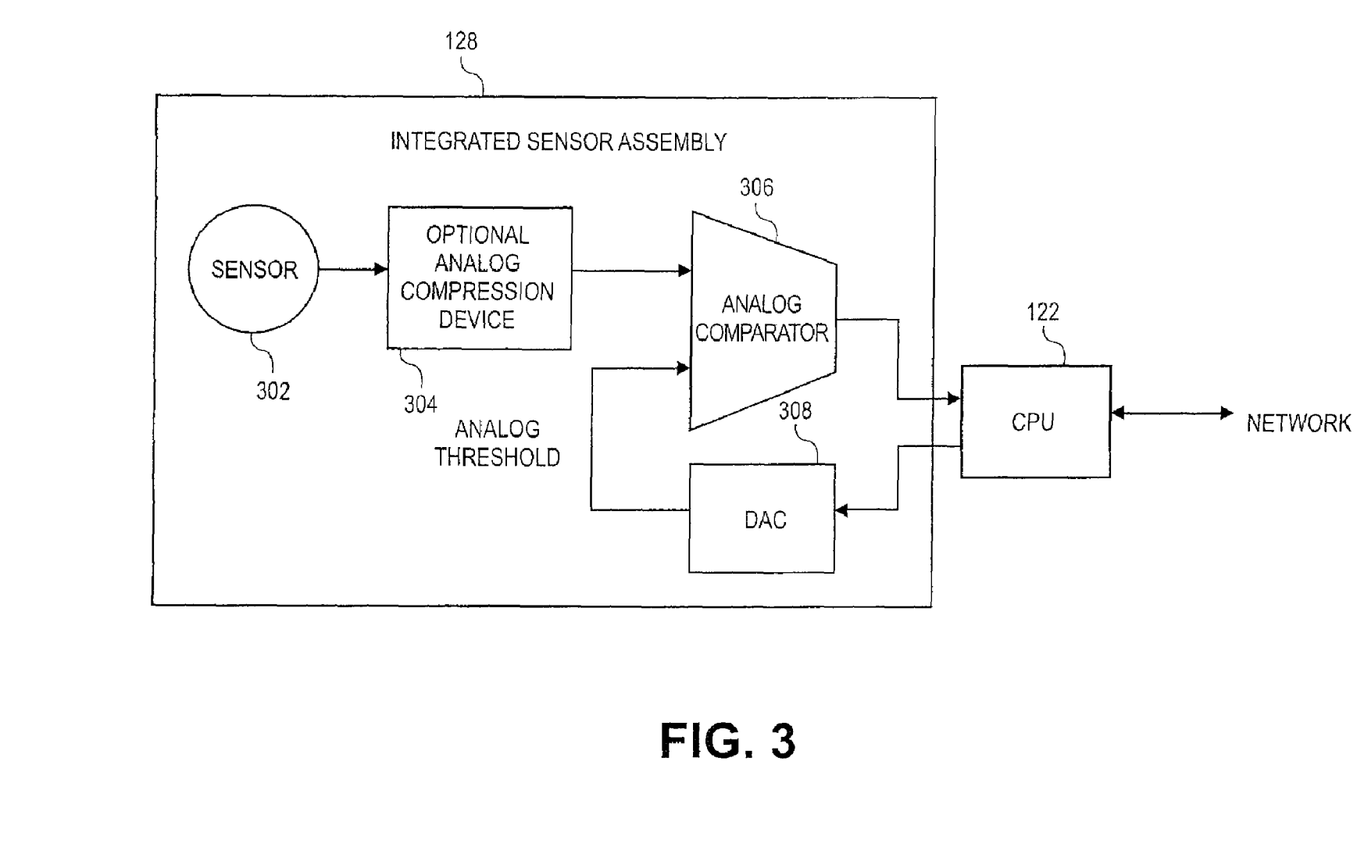
FIG. 3 is a functional block diagram of the architecture for another sensor that can be utilized in embodiments of the invention.

The WAP 100 also includes one or more sensors 128 electrically coupled to a bus communicatively coupled with the CPU 122 and Ethernet signaling circuitry. In the context of this invention, the term "sensor" is to be understood broadly as encompassing any device capable of responding to a stimulus, detecting an event, or otherwise reacting to its environment by outputting a signal, such as an electrical, mechanical, or optical signal. Furthermore, the word "sensor" is used throughout this document to refer to both an assemblage of components that includes a sensor, as shown in FIGS. 2 and 3, or just the sensor itself. For example, it is contemplated that the sensor could comprise a thermometer, a light detector, a still image camera, a video camera, a smoke detector, a motion detector, a weather sensor, a sound detector, or an electrical sensor. A sensor may also include any other device or circuitry necessary to condition or alter the sensor output, or support a communication link from the sensor 128 to the CPU 122. It should be recognized that this list of sensor types is not all-inclusive and that there are many other sensors that could be incorporated into certain embodiments of the invention.

The output of the sensor can be an analog or digital signal, as dictated by the application in which it is being used. The sensor 128 may receive control signals from the CPU 122. The CPU 122 and the Ethernet signaling circuitry of the WAP 100 may receive data output from the sensor 128, package the data output into one or more data packets, and transmit the data over the computer network to any other device connected to the network. In some embodiments, data from the sensors can be sent to a central server where it can be monitored or processed. Certain layers of a communication protocol stack may be added to the WAP 100 to assist in encapsulating and transmitting the data to another network device. For example, with reference to the Open Systems Interconnection (OSI) standard, the CPU 122 could be programmed with Data, Network, and Transport layers, as necessary, to encapsulate data from the sensor 128 and manage communication with other networked devices. In some embodiments of the invention, a standard communication protocol such as TCP/IP may be the communication protocol of choice, but other, for example proprietary, communication protocols can also be used without departing from the scope of the invention. In some embodiments it may be preferable to send sensor output data in User Datagram Protocol (UDP) packets in order to simplify layers of the protocol stack. Many communication protocols are known in the art and can be added to the WAP 100 as dictated by the complexity of the output from the sensor 128. In many cases, the existing hardware of the WAP can be programmed to implement the necessary protocols. Other embodiments may require additional hardware.

In this way, building owners can leverage their investment in computer network infrastructure to deploy sensors throughout the premises. The sensors can be manufactured inexpensively because they can be designed to share existing WAP hardware rather than each including its own processor and communication circuitry. Plus, little, if any, additional building infrastructure modification is necessary. As previously discussed, the sensors can serve a practically endless number of functions. The sensors may detect motion or capture video to alert the presence of intruders in unauthorized areas or just to monitor people traffic throughout the premises. Other sensors may detect temperature or light in various rooms to aid in building climate control or power usage control, respectively. All of this information can be collected to a central location quickly and efficiently using the principles of the invention.

In certain embodiments of the invention sensory data can be detected at a sensor and then processed and formed into data packets at the WAP. The data packets can then be forwarded over a network by the WAP and received at a server. The server may simply record and compile the data sent to it from various sensors. In other embodiments, the server may display or process the data. The server may also respond to the sensor data, whether the response be generated by a computer program or a human being, by sending a data packet over the network to a device or to the WAP containing, for example, instructions for the WAP processor to alter the state of the sensor in some way.

FIG. 2 illustrates the architecture for a sensor that may be used in some embodiments of the invention. An integrated sensor assembly 128 is communicatively coupled to the WAP CPU 122. The integrated sensor assembly may include a sensor 202, an optional analog compressor-expander (compander) 204, an analog-to-digital converter (ADC) 206, and a link driver 208. In some embodiments the sensor 202 outputs an analog electrical signal. The output of the sensor 202 is electrically coupled to the ADC 206 and converted to a digital signal. The link driver 208, electrically coupled to the ADC 206, facilitates transmission of the signal to the CPU 122. This may include establishing a communication protocol to send the digitized sensor output to the CPU 122 as well as receiving data and clock signals from the CPU 122. In certain embodiments, an analog compander 204 may be electrically coupled between the sensor 202 and the ADC 206. The compander 204, such as a common logarithm amplifier, expands the dynamic range of the ADC 206. Any one of these components may be of any variety known in the art that is suitable for a given sensory application.

The sensor architecture of FIG. 2 supports continuous data output, such as video data or a continuous temperature profile, as well as a threshold or event-type output. When used in the threshold detection mode, the threshold can be adjusted by the CPU 122 via system software. In most cases, the threshold detection mode will place a significantly lower load on the CPU than the continuous detection method.

FIG. 3 illustrates the architecture for another sensor that may be used in some embodiments of the invention. The sensor assembly 128 comprises a sensor 302, an optional analog compander 304, an analog comparator 306, and a digital-to-analog converter (DAC) 308. In some embodiments, the sensor 302 outputs an analog electrical signal. The output of the sensor can be electrically coupled to one input of the analog comparator 306. The second input of the analog comparator 306 can be the output of the DAC 308. The analog comparator compares its two input signals and outputs a signal that is indicative of the results of that comparison, which is fed to the CPU 122. In turn, the CPU can be used to set the input signal to the DAC 308. In some embodiments, an analog compander is electrically coupled between the sensor 302 and the analog comparator 306 to increase the dynamic range of the sensor assembly 300. This sensor architecture acts as a threshold detector where the analog threshold is adjustable and can be set by software via the CPU 122 and the DAC 308. The sensor architecture illustrated in FIG. 3 requires very little processing power. While FIGS. 2 and 3 illustrate two exemplary sensor architectures, many others are known in the art and can be used in certain embodiments of the invention.

FIGS. 4-8 show perspective views of the mechanical design of various embodiments of a wireless computer network access point with a sensor. The description of many of these embodiments will make reference to electrical jacks and corresponding plugs or connectors with the understanding that the connectors, plugs, and jacks can generally be physically interchanged in different designs. Furthermore, many different types of jacks, connectors, ports, and plugs of different shapes, sizes, and designs are known in the art and can be substituted for those shown in the figures or described in the following specification.

Figure 4:
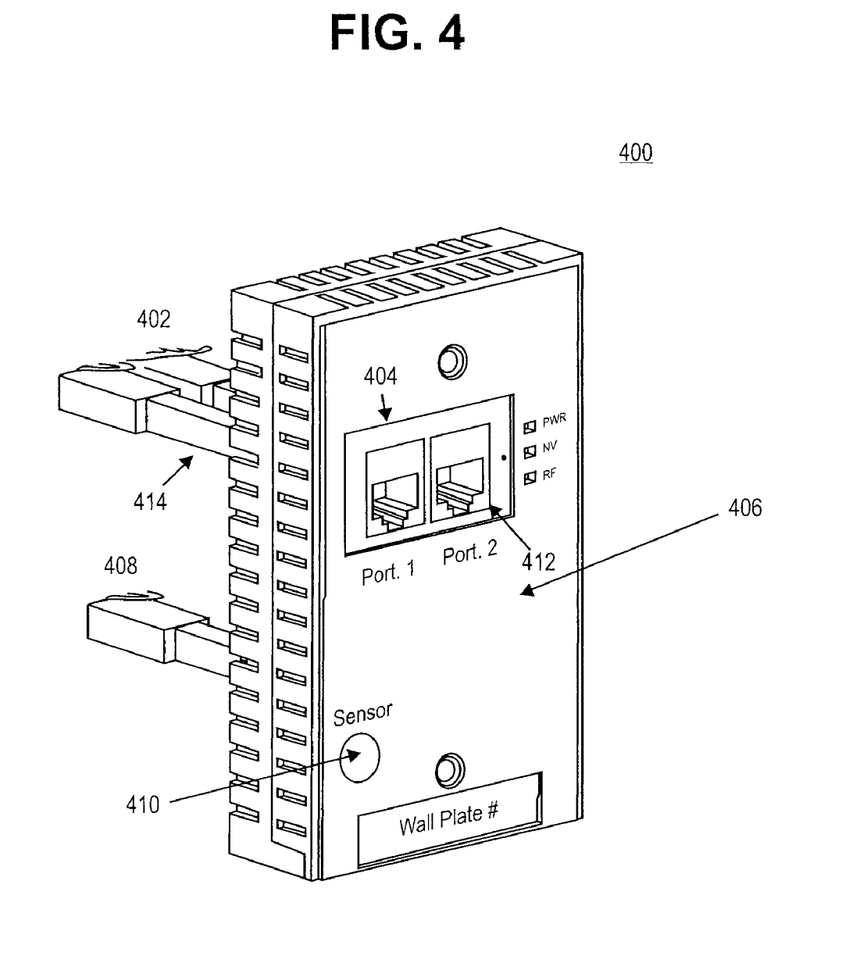
FIG. 4 is a perspective view of a wireless computer network access point with an integrated sensor.

The design 400 illustrated in FIG. 4 is a WAP with an integrated sensor. The WAP with an integrated sensor comprises a housing 406 containing typical WAP components and includes a built-in sensor 410. The illustrated embodiment also includes the WAP's wired network connection 408, which may also serve as a power source using Power over Ethernet. In addition, it includes pass-through wired computer and telephone network ports 402. Pass-through wired communication network ports are taught in co-pending patent applications (Insert App. Nos. for P96 & P102) assigned to Extreme Networks™.

The shape of the WAP housing 406 is shown as being generally box-like, but other shapes are also suitable. Functionality and aesthetics may be considered when determining the proper shape and size for a given application. The WAP housing 406 may be designed to fit inside a building wall in an electrical junction box such as those that commonly house wired connections to communication networks in buildings. The WAP housing 406 may also be designed to mount against an outer surface of the wall and to be substituted for or comprise a wall plate or ceiling mount such as those commonly used to cover wired network access points. Configurations of this sort may be referred to as unified wired and wireless network access wall plates and are also taught in the above-referenced patent applications assigned to Extreme Networks. Unified wired and wireless network access wall plates may be designed for installation at pre-existing wired network access points (those that have not been installed for the express purpose of adding a WAP to a building network) with the advantage of being easily incorporated in buildings with wired network access points already in place.

The housing 406 includes a passage designed to receive an insert 404. In some embodiments, the insert 404 may comprise jacks 412 that allow a user to make wired connections to network devices from the building's wired network infrastructure, as shown in FIG. 4. The jacks 412 may be connected to dongles 414 with plug connectors 402 that can mate with the building's wired network infrastructure. In some embodiments theses can be type RJ-11 and RF-45 connector assemblies. These are referred to as pass-through ports because they act as an extension of wired network connections through the WAP assembly 400. The wired network connections are not otherwise significantly altered by the WAP assembly 400. In other embodiments, the pass-through wired communications ports may be unnecessary, in which case the insert may simply comprise a cover plate to seal the passage from tampering or contamination. In embodiments of the invention employing the unified wired and wireless network access wall plate concept, the location, shape, and size of the passage through the WAP can be chosen to accommodate the configuration of any common network connection wall plate, as such wall plates commonly differ in design from country to country. Furthermore, though not shown, the passage may also be designed with additional space for the wired network connection 408 to be located in an inner wall of the passage. Such a design would allow the rear surface of the WAP housing 406 to more easily lie flat against a wall or other planar surface and provide physical security from tampering with the connections. FIG. 4 therefore illustrates a unified wired/wireless network access wall plate with a built-in sensor. This design provides a user with wired and wireless network connectivity as well as sensing capabilities all in one small form-factor device.

Figure 5:
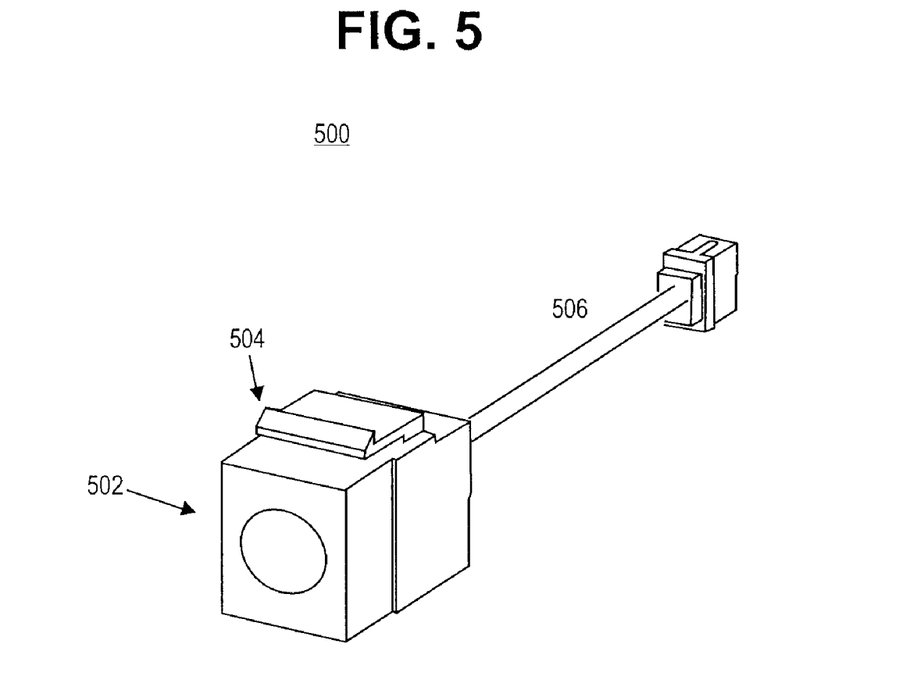
FIG. 5 is a perspective view of a detachable sensor module that can be incorporated into some embodiments of the invention.

Unlike FIG. 4, which illustrates a WAP with a built-in sensor, FIG. 5 illustrates the design of a detachable sensor that can be incorporated into certain embodiments of the invention. In embodiments incorporating a detachable sensor, the WAP serves as a physical platform to which different sensors can be connected. The sensor is made detachable to provide the user with greater flexibility in selecting what kind of sensor to use with a particular WAP or in a particular location. The user may also easily swap, replace, or upgrade the detachable sensor if necessary. In some embodiments, the detachable sensor module 502 includes attachment clips 504 and a pigtail connector 506.

Figure 6:
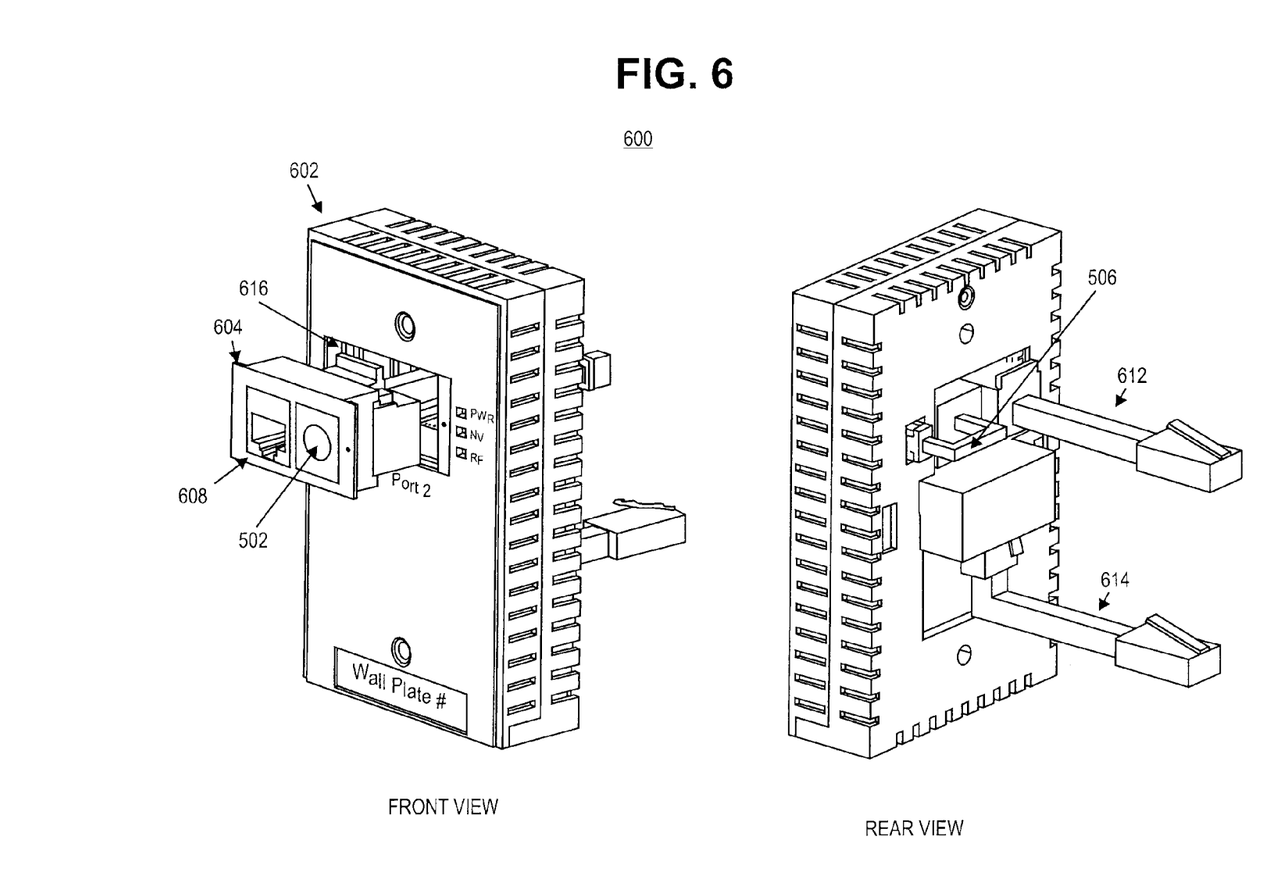
FIG. 6 shows front and rear perspective views of a wireless computer network access point with a detachable sensor module.

In general, a detachable sensor can be designed to connect to a WAP at any location. However, FIG. 6 illustrates one embodiment of a WAP with a detachable sensor where the sensor is designed to attach to the insert 604, which is received into the passage 616 through the WAP housing 602. The attachment clips 504 allow the detachable sensor to be sturdily mated with the insert 604. The pigtail connector 506 is inserted into a jack on the backside of the WAP housing 602 to electrically couple the detachable sensor module 502 to the WAP. The insert 604 can be designed to comprise a single detachable sensor module 502, one detachable sensor module 502 and one communications network jack 608, as shown in FIG. 6, or two detachable sensor modules 502. Other configurations are also possible and are within the understanding of one of ordinary skill in the art.

Figure 7:
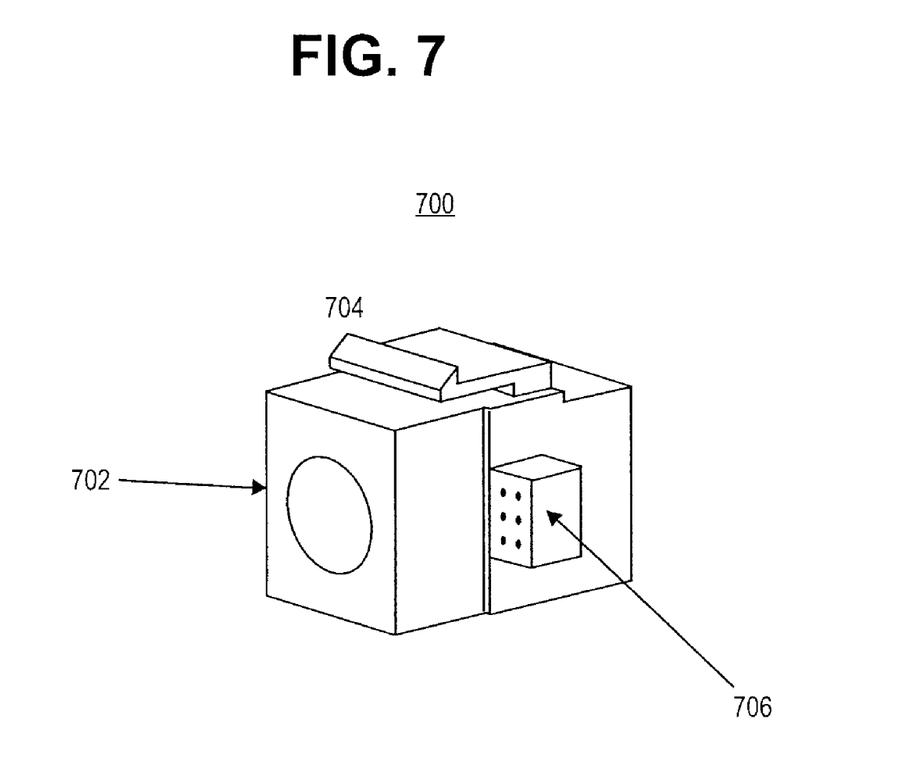
FIG. 7 is a perspective view of another example of a detachable sensor module that can be incorporated into some embodiments of the invention.
Figure 8:
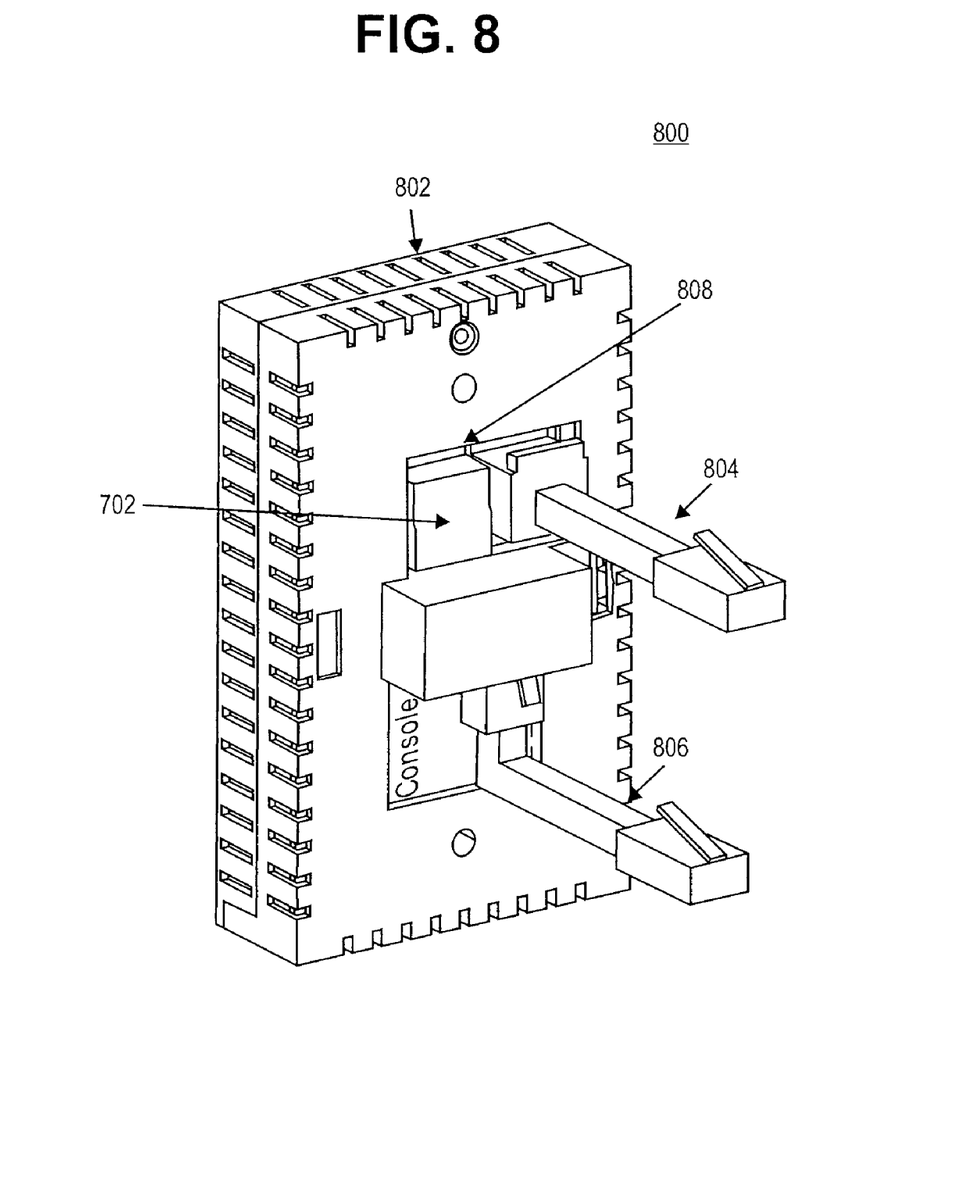
FIG. 8 is a rear perspective view of another example of a wireless computer network access point with a detachable sensor module.

FIG. 7 illustrates another design of a detachable sensor that can be incorporated into certain embodiments of the invention. The sensor module 702 includes connector clips 704 as well as an integrated electrical connector 706. The integrated electrical connector 706 can be of any shape, size, pin-count, etc. that allows it to properly mate with a corresponding jack on a WAP. While the detachable sensor of FIG. 7 can be designed to connect to a WAP at any location, FIG. 8 illustrates one embodiment where the detachable sensor module 702 is designed to connect to the WAP housing 802 inside the passage 808 and is electrically coupled to the WAP circuitry via a jack (not shown) on the inner surface of the passage 808. The detachable sensor module may be designed to attach to an insert 604 such as the one shown in FIG. 6, which is received into the passage 808 through the WAP housing 802. In other embodiments, the detachable sensor module 702 may be received directly into the passage 808. The detachable sensor module 702 may be designed to occupy the entire passage 808 or a portion of the passage 808 with the remainder occupied by a pass-through communications network connection.

While certain exemplary embodiments have been described and shown in the accompanying drawings, it is to be understood that such embodiments are merely illustrative of and not restrictive, and that the embodiments of the present invention are not to be limited to specific constructions and arrangements shown and described, since various other modifications may occur to those ordinarily skilled in the art upon studying this disclosure. Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than the set of all features of a single foregoing disclosed embodiment.

What is claimed is:

1. A device, comprising:
   a wireless network access point (WAP) having an Ethernet medium access control (MAC) coupled to a dedicated WAP processor; and
   a sensor coupled to the wireless network access point processor,
      the sensor to collect external sensory data associated with an application other than network management, and
      the processor to encapsulate the external sensory data according to a local area network (LAN) communication protocol, and to send control signals to the sensor,
   wherein the wireless network access point is to transmit, via the LAN communication protocol, the encapsulated external sensory data associated with an application other than network management to a central network server to be processed.

2. The device of claim 1, wherein the wireless network access point comprises one or more pass-through wired communication network ports.

3. The device of claim 2, wherein the wireless network access point is configured to couple with a communication network infrastructure at a pre-existing wired communication network access point.

4. The device of claim 2, wherein the communication network infrastructure comprises telephone and data networks.

5. The device of claim 2, further comprising:
   a housing, containing the wireless network access point, to mount to an exterior surface of a wall, the housing including an opening defining a passage therethrough;
   a removable insert configured to mate with the opening; and
   a first connector accessible to connect the wireless network access point to a first communication cable inside the wall.

6. The device of claim 5, wherein the housing encompasses the sensor.

7. The device of claim 5, wherein the removable insert comprises a second connector to connect a second communication cable inside the wall to a communication cable outside the wall.

8. The device of claim 7, wherein the removable insert further comprises the sensor.

9. The device of claim 7, wherein the second connector comprises an Ethernet (RJ-45) jack or a telephone (RJ-11) jack.

10. The device of claim 5, wherein the removable insert comprises a cover plate to prevent physical access through the passage.

11. The device of claim 5, wherein the removable insert comprises the sensor.

12. The device of claim 11, wherein the sensor electrically couples to the wireless network access point via a pigtail connector.

13. The device of claim 11, wherein the sensor electrically couples to the wireless network access point via an integrated connector.

14. The device of claim 5, wherein the first communication cable carries data and power signals.

15. The device of claim 1, wherein the wireless network access point operates in accordance with the IEEE 802.11 standard.

16. The device of claim 1, wherein the sensor is selected from the group comprising:
   a thermometer;
   a light detector;
   a still image camera;
   a video camera;
   a smoke detector;
   a motion detector;
   a weather sensor;
   a sound detector;
   an electrical conductivity detector; and
   combinations thereof.

17. The device of claim 1, wherein the sensor is physically integrated in a housing of the wireless network access point.

18. The device of claim 1, wherein the sensor detachably couples to the wireless network access point.

19. The device of claim 1, wherein the sensor is communicatively coupled to a server via a local area network (LAN).

20. The device of claim 1, wherein the sensor is configured to electrically couple to a bus within the wireless network access point, the bus providing access to a processor and Ethernet signaling circuitry.

21. The device of claim 20, wherein the sensor comprises a physical sensing device electrically coupled to an analog-to-digital converter electrically coupled to a link driver, the link driver to communicate with the processor 22. The device of claim 21, wherein the sensor comprises a compander electrically coupled between the physical sensing device and the analog-to-digital converter.

23. The device of claim 20, wherein the sensor comprises an analog comparator having inputs from a physical sensing device and an output of a digital-to-analog converter, the output of the analog comparator electrically coupled to the processor, and the output of the digital-to-analog converter programmable by the processor.

* * * * *